United States Patent
O'Rourke et al.

(10) Patent No.: US 7,894,359 B2
(45) Date of Patent: Feb. 22, 2011

(54) SYSTEM AND METHOD FOR DISTRIBUTING INFORMATION IN A NETWORK ENVIRONMENT

(75) Inventors: Chris O'Rourke, Apex, NC (US); Louis F. Menditto, Raleigh, NC (US); Dwight R. Frye, Jr., Cary, NC (US); Keith R. Schomburg, Apex, NC (US); Robert A. Mackie, Cary, NC (US); Mark Albert, Morrisville, NC (US); Walter G. Dixon, Fuquay-Varina, NC (US); Thomas R. Bakita, Raleigh, NC (US); Frank W. Pittenger, Raleigh, NC (US); John G. White, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 639 days.

(21) Appl. No.: 11/869,780

(22) Filed: Oct. 10, 2007

(65) Prior Publication Data

US 2008/0034409 A1 Feb. 7, 2008

Related U.S. Application Data

(63) Continuation of application No. 10/313,403, filed on Dec. 6, 2002, now Pat. No. 7,292,538.

(51) Int. Cl.
*H04L 12/26* (2006.01)
(52) U.S. Cl. .................................... 370/252
(58) Field of Classification Search ............ 370/252
See application file for complete search history.

(56) References Cited

U.S. PATENT DOCUMENTS

| | | | |
|---|---|---|---|
| 4,799,153 A | 1/1989 | Hann et al. ............... 726/3 |
| 5,673,259 A | 9/1997 | Quick, Jr. ............... 370/342 |
| 5,905,736 A | 5/1999 | Ronen et al. ............... 370/546 |
| 5,956,391 A | 9/1999 | Melen et al. ............... 379/114 |
| 5,970,477 A | 10/1999 | Roden ............... 705/32 |
| 6,021,495 A | 2/2000 | Jain et al. ............... 726/16 |
| 6,047,051 A | 4/2000 | Ginzboorg et al. ............... 379/130 |
| 6,230,012 B1 | 5/2001 | Willkie et al. ............... 455/435 |
| 6,292,838 B1 | 9/2001 | Nelson ............... 709/236 |
| 6,307,837 B1 | 10/2001 | Ichikawa et al. ............... 370/230 |
| 6,374,112 B1 | 4/2002 | Widegren et al. ............... 455/452 |
| 6,456,604 B1 | 9/2002 | Lee et al. ............... 370/328 |
| 6,463,274 B1 | 10/2002 | Robertson ............... 455/406 |
| 6,466,556 B1 | 10/2002 | Boudreaux ............... 370/331 |
| 6,470,395 B1 | 10/2002 | Van Aken et al. ............... 709/245 |
| 6,728,232 B2 | 4/2004 | Hasty et al. ............... 370/338 |
| 6,789,127 B1 | 9/2004 | Chandra et al. ............... 709/246 |
| 6,987,987 B1 | 1/2006 | Vacanti et al. ............... 455/556.2 |
| 2001/0052081 A1 * | 12/2001 | McKibben et al. ............... 713/201 |
| 2002/0059114 A1 | 5/2002 | Cockrill et al. ............... 705/27 |
| 2005/0083911 A1 | 4/2005 | Grabelsky et al. ............... 370/352 |

FOREIGN PATENT DOCUMENTS

| WO | WO 98/26381 | 12/1997 |
|---|---|---|
| WO | WO 99/31610 | 12/1998 |

\* cited by examiner

*Primary Examiner*—Melvin Marcelo
(74) *Attorney, Agent, or Firm*—Baker Botts L.L.P.

(57) ABSTRACT

A method for distributing information in a network environment is provided that includes receiving one or more packets from a communication flow initiated by an end user and selectively communicating information associated with the communication flow to a network element so that the network element may correlate a source with the communication flow.

20 Claims, 2 Drawing Sheets

SYSTEM AND METHOD FOR DISTRIBUTING INFORMATION IN A NETWORK ENVIRONMENT

CROSS-REFERENCE TO RELATED APPLICATION

This application is a continuation of U.S. application Ser. No. 10/313,403 filed Dec. 6, 2002 and entitled "System and Method for Distributing Information in a Network Environment".

TECHNICAL FIELD OF THE INVENTION

This invention relates in general to the field of network communications and more particularly to a system and method for distributing information in a network environment.

BACKGROUND OF THE INVENTION

Effective network communications is becoming increasingly important in today's society. One aspect of network communications relates to the ability to gather or to monitor information that is contained within a communication flow. Devices, components, and equipment within a network may wish to glean information from the communication flow in order to provide some capability or enhancement to entities within a network or to provision services for an end user based on his identity or particular situation.

In attempting to monitor or to glean information from a communication flow, network designers generally insert a piece of network equipment somewhere in a communications link such that the communication flow passes through the inserted piece of network equipment. This network configuration suffers from a number of drawbacks. For example, pieces of network equipment that are inserted into the communication pathway may slow overall network communications because the communication flow needs to be received and then retransmitted at each piece of equipment in the communication flow. In addition, some of the inserted network devices may wish to process the information within the communication flow before communicating the data to a next destination. Additionally, the processing of the information may affect the communications format and present compatibility or encryption/decryption problems for devices and equipment positioned downstream of the processing devices. Moreover, the inserted piece of network equipment may only need a small amount of information and not a continuous stream of the entire communication flow.

SUMMARY OF THE INVENTION

From the foregoing, it may be appreciated by those skilled in the art that a need has arisen for an improved network communications approach that provides the capability for network devices or components to receive information associated with communication flows. In accordance with one embodiment of the present invention, a system and method for distributing information in a network environment are provided that substantially eliminate or greatly reduce disadvantages and problems associated with conventional information distribution techniques.

According to one embodiment of the present invention, there is provided a method for distributing information in a network environment that includes receiving one or more packets from a communication flow initiated by an end user and selectively communicating information associated with the communication flow to a network element so that the network element may correlate a source with the communication flow.

Certain embodiments of the present invention may provide a number of technical advantages. For example, according to one embodiment of the present invention, a network communications approach is provided that allows multiple devices or components within a network environment to receive information relating to a communication flow without burdening the overall communication system. Effective communications may be realized because an identity broker may be inserted in the communication flow instead of a series of intrusive devices that slow network communications. The identity broker operates to share information amongst all interested devices and may perform the sniffing or detecting function at a single location. The identity broker may also avoid latency issues caused by network equipment that prolong the delivery of a communication flow because of either processing requirements or the receiving and retransmitting of data.

Another technical advantage associated with one embodiment of the present invention relates to easier manageability for network architectures. This is achieved by having a single identity broker in the communication flow that allows changes or modifications to the network to implicate only that element instead of a series of devices or components in the communication flow. The integration of new components in the network is also made easier because only the identity broker is affected by the change in network configuration. Also, formatting, encryption/decryption, and compatibility issues with new equipment being introduced in the communication flow will only implicate the identity broker instead of every piece of network equipment in the stream of the communication flow.

Still another technical advantage offered by one embodiment of the present invention relates to its flexibility. The use of an identity broker provides a single point of entry for potential overrides to the end user identity/correlation function. This may operate to ensure that a proper end user profile is matched with a given communication flow. Thus, the architecture provides better accuracy and improved fault tolerance than would otherwise be obtained by using several points or nodes in the network that attempt to offer a portion of this functionality. Moreover, the identity broker does not create multiple interferences in the authentication, authorization, and accounting (AAA) functions. The flexibility of the identity broker is further reflected by the ability to correlate an identity of an end user across disparate network access technologies. This is true because each network data source may be treated as an alternative data source and processed accordingly.

Yet another technical advantage associated with one embodiment of the present invention relates to the failover capabilities within the network. The non-operation of a single component seeking information relating to the communication flow will not affect the overall operation of the network. This is true because the identity broker is the only piece of network equipment involved in the communication flow. The involvement of the identity broker is generally passive and therefore its non-operation does not impact system performance. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
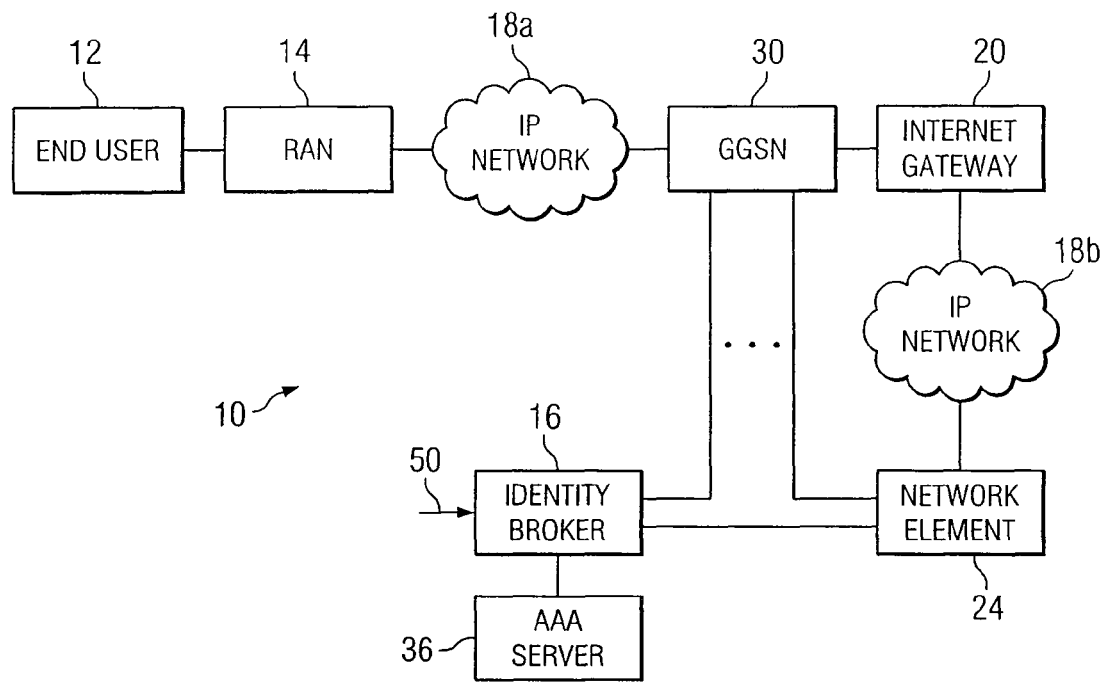
FIG. 1 is a simplified block diagram of a communication system for distributing data in a network environment.

FIG. 1 is a simplified block diagram of a communication system 10 for monitoring data in a network environment in accordance with one embodiment of the present invention. Communication system 10 includes an end user 12, a radio access network (RAN) 14, an identity broker 16, and multiple internet protocol (IP) networks 18a and 18b. Communication system 10 may also include an internet gateway 20, a network element 24, a gateway general packet radio service (GPRS) support node (GGSN) 30, and an authentication, authorization and accounting (AAA) server 36. Communication system 10 may be generally configured or arranged to represent a 2.5 G communication architecture applicable to a global system for mobile (GSM) environment. Communication system 10 may also be configured to represent a 3 G GSM architecture, a wire based network, a dial-up architecture, other appropriate mobile data networks associated with GPRS protocols, or any other suitable communicative platform, arrangement, or configuration in accordance with particular needs.

According to the teachings of one embodiment of the present invention, identity broker 16 operates to replace, to supplement, or to imitate a network component (or the capabilities thereof) that is positioned in a communication flow initiated by end user 12. Identity broker 16 may glean information from the communication flow and then selectively disseminate data associated with the communication flow to network element 24. The information gleaned by identity broker 16 and subsequently communicated to or shared with other elements in communication system 10 may be any suitable data such as the physical location of end user 12, protocols or technologies being used in the communication flow, historical information, bandwidth parameters, communication service data, quality of service information, user preferences, or any other suitable network characteristics or end user parameters. This data may also be statically or dynamically assigned, or otherwise stored or communicated in any appropriate fashion.

Additionally, identity broker 16 may provide an element for correlating specific IP addresses (temporary or permanent) with user identity data in real-time. Identity broker 16 may publish the resulting information to any interested element or piece of network equipment. The tasks performed by identity broker 16 may be executed without requiring end user 12 to take any special action beyond those normally involved in accessing a given network in the absence of identity broker 16.

The use of identity broker 16 allows multiple devices or components within communication system 10 to receive information relating to a communication flow without burdening the overall system architecture by being inserted directly into the communications pathway. The use of identity broker 16 may also avoid the necessity for network element 24 to have its own proxying device in the communication flow between end user 12 and AAA server 36 in order to gain access to the communication flow and detect or monitor relevant information associated therewith.

Identity broker 16 may also enhance the speed of network communications because only identity broker 16 is inserted in the communication flow instead of a series of intrusive devices that operate to slow network communications. Identity broker 16 may share information amongst interested pieces of network equipment, such as network element 24, and may further perform sniffing, gleaning, or detecting functions at a single location. The use of a single proxying point provided by identity broker 16 effectively avoids latency issues caused by network equipment that may prolong the delivery of a communication flow due to processing requirements or because of the reception and retransmission of data. Identity broker 16 may also significantly reduce the complexity of a network architecture as only one device provides a system constraint with respect to failover, redundancy, and integration considerations.

Identity broker 16 may also provide a single point of entry for potential overrides to the identity/correlation function associated with end user 12. Thus, the architecture provided by communication system 10 offers better accuracy and improved fault tolerance than would otherwise be obtained by using several points or nodes in the network that attempt to offer a portion of this functionality. Moreover, identity broker 16 does not create multiple interferences for AAA functions. The flexibility of identity broker 16 is further reflected by the ability to correlate a source or an identity of end user 12 across disparate network access technologies. This is true because each network data source may be treated as an alternative data source and processed accordingly.

End user 12 is a client or a customer seeking to initiate or to establish a communication tunnel, link, or session in communication system 10 via IP network 18a. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, or script data, or any type of source or object code, or any other suitable information in any appropriate format that may be communicated from one point to another.

In operation of a particular embodiment of the present invention, end user 12 initiates (or causes to be initiated by RAN 14) a communication flow within a network using a RADIUS communication protocol. Alternatively, any suitable communications protocol may be used by end user 12 in order to facilitate a communications session or a communication flow between two pieces of network equipment within communication system 10. For example, diameter or a terminal access controller access system (TACACS) protocol may be used in communication system 10. TACACS represents an industry standard protocol specification, RFC 1492, that forwards username and password information to a centralized server. The centralized server can either be a TACACS database or a database like the UNIX password file with TACACS protocol support.

The RADIUS communication protocol may send a number of elements within the communication flow, such as a network access server (NAS) IP address (indicating which NAS granted access to end user 12 onto the network), a framed IP address (potentially indicating the IP address that may be used as a key to look up user-specific information), a NAS identifier, a mobile station identifier (the entity that generated or otherwise placed the original communication), a calling station identifier (the number that initiated the call), vendor-specific information, or any other suitable information or data. In certain scenarios, the identity of end user 12 may be provided by a calling station ID or by user-name RADIUS attributes. In a particular embodiment of the present invention, this information is specific to a layer two session of end user 12.

RAN 14 is a communications interface or platform operating between end user 12 and IP network 18*a*. RAN 14 may comprise a base transceiver station and a base station controller. The communications interface provided by RAN 14 allows data to be exchanged between end user 12 and any number of selected elements within communication system 10. RAN 14 facilitates the delivery of a request packet generated by end user 12 and the reception of information sought by end user 12. RAN 14 offers only one example of a communications interface between end user 12 and internet gateway 20. Other types of communications interfaces or platforms may be used for any particular network design or configuration in accordance with particular needs.

RAN 14 may provide access to a network for end user 12. RAN 14 may be used with a transmission control protocol/internet protocol (TCP/IP) network, including serial terminal access controllers, modem pools or stacks, integrated services digital network (ISDN) routers, and multi-function access controllers. RAN 14 may also be used in combination with any element that provides switched service connections, point-to-point (PPP) serial IP protocols, and user authentication functions. RAN 14 may support serial line internet protocol (SLIP) and/or PPP protocols, allowing RAN 14 to establish and to manage the individual communications links to the remote sites across a switched service. RAN 14 may authenticate end user 12 before allowing access to a network or to another server. RAN 14 may also store one or more identification elements or passwords that may be used in authenticating end user 12.

RAN 14 may use TACACS, RADIUS, diameter, or any other suitable communications protocol in order to provide an authentication functionality to communication system 10. In a particular embodiment, the communication protocol implemented by RAN 14 is RADIUS. RAN 14 may use a network access identifier (NAI) such as the user ID submitted by end user 12 during PPP authentication. The NAI may be used to identify end user 12 as well as to assist in the routing of an authentication request. RAN 14 may establish a layer two communication session with end user 12. RAN 14 may also provide AAA functions on behalf of end user 12 and perform IP address management for end user 12.

In operation, the base transceiver station within RAN 14 may provide transmit and receive interface links for communication system 10. One or more base transceiver stations may receive information from end user 12 in the form of data packets and communicate the data packets or information to corresponding base station controllers. The base station controllers may work in conjunction with the base transceiver stations in order to provide a link or interface between end user 12 and IP networks 18*a* or 18*b*. Base station controllers may then communicate data packets or information received from the base transceiver station to a network component within communication system 10.

The base transceiver station within RAN 14 may be a radio transmission and reception station for handling communications traffic. The base transceiver station may also be identified as a cell site, primarily so because it may hold one or more transmit/receive cells. One or more base transceiver stations within communication system 10 may comprise one or more receive/transmit antennas, a base station controller, a microwave dish, and suitable associated electronic circuitry.

It is important to note that the use of RAN 14 and IP network 18*a* have been offered for purposes of example only. These elements collectively reflect the generic concept of an access network and therefore could be replaced with any suitable node or communications platform operable to establish a data exchange between end user 12 and any appropriate location of the network. Additionally, these elements may be replaced with any piece or network equipment, component, or device that accomplishes or otherwise facilitates this operation.

Identity broker 16 is a component that monitors, proxys, sniffs, gleans, or otherwise detects information from a communication flow and makes that information available to other network equipment in communication system 10. Although described in the context of AAA applications, identity broker 16 need not be based on AAA topologies, configurations, protocols, or architectures. Identity broker 16 may be any element that gains access to a communication flow between two points and may include any suitable hardware, software, component, element, or object that facilitates this task. The AAA application has been offered only for purposes of teaching and example. Identity broker 16 represents a single authoritative snooping element that may be positioned in place of (or in conjunction with) devices performing similar functions. Identity broker 16 reduces architecture complexity, provides for easier integration of network equipment, and allows communication system 10 to be managed more easily. Proxying is solved once by identity broker 16, in one location, instead of several devices being implicated. Identity broker 16 may additionally allow for the use of multiple passwords to be used by multiple network elements, and further offer the capability to tailor the information provided to the network elements in accordance with particular needs. Identity broker 16 may also perform any necessary encrypting or decrypting protocols, or other suitable transformations where appropriate, as a request packet propagates through communication system 10. This may be particularly beneficial in the RADIUS communication protocol where encryption/decryption is generally needed and operates to slow communications propagating through a network.

Identity broker 16 may replicate traffic between AAA server 36 and end user 12 (via GGSN 30) for network element 24. Identity broker 16 may be designed to be a passive proxy in the communication flow. In a particular embodiment, network element 24 may be configured to treat identity broker 16 as both client and server. Identity broker 16 may also offer an extensible mark-up language (XML) interface or a common object request broker architecture (CORBA) interface to any one of the network elements within communication system 10. Identity broker 16 (or AAA server 36) may also store one or more profiles associated with end user 12. The profiles may include information relating to user privileges, QoS parameters, access rights, user preferences, or bandwidth allocation characteristics for example. Identity broker 16 may also provide secure access where appropriate for the correlated identity data. This may enable network operators to engage in the business of offering or selling information about a 'situation' of one or more active end users 12.

In operation, identity broker 16 may glean information from data segments or hyper-text transfer protocol (HTTP) to identify a source associated with a packet propagating through communication system 10. The identification of the source may provide a correlation between end user 12 and a corresponding profile. For example, identity broker 16 may learn about end user 12 or a source through RADIUS packet inspection. Identity broker 16 may also learn about end user 12 or a source through diameter communication protocols, TACACS protocols, or any other communications protocols used in any suitable network applications.

For a pre-existing network element 24, identity broker 16 may proxy traffic from the communication flow initiated by end user 12. Having read or otherwise received the communication flow, identity broker 16 may then replicate message flows through one or more network elements 24 independently. In seeing identity broker 16 as both client and server, network element 24 may be duped into thinking that it is installed in the main flow of RADIUS communications. Because identity broker 16 is configured to reflect the true reply of AAA server 36 back to network element 24, some state information may be maintained about the status of the communication flow between end user 12, AAA server 36, and network element 24. For example, when a request is replicated to network element 24 it will be provided back to identity broker 16. Identity broker 16 may then wait for the actual reply to this request and replicate it back to network element 24. When network element 24 proxies this information back to identity broker 16, the message may be acknowledged and then dropped. Particularly in the case for a pre-existing network element 24, identity broker 16 may be configured to identify whether or not to wait for the forwarded message from network element 24 before proxying a message to either end user 12 or AAA server 36. This may be performed in certain scenarios in order to accommodate assumptions about timing that may already exist.

Other network equipment that seeks to monitor information from the communication flow may simply terminate the replicated RADIUS (or other communication) protocol from identity broker 16 in the same manner as a server would perform such a task. This may be particularly appropriate for equipment that is interested only in accounting messages or some other specific type of information and not all information within the communication flow. This configuration is simpler as the main flow is not impacted and only the state of the protocol between identity broker 16 and network element 24 is maintained.

In either case, whether network element 24 is pre-existing or newly introduced into communication system 10, identity broker 16 may enable filtering of communication flows such that a given network element 24 may review only the messages of potential interest. Alternatively, identity broker 16 may disseminate all information related to the communication flow to every piece of network equipment capable of receiving such a communication. Identity broker 16 may also provide network element 24 with access to the information derived from AAA flows across other interfaces, such as CORBA, XML, or any other suitable communications interface according to particular needs.

IP networks 18a and 18b each represent a series of points or nodes of interconnected communication paths for receiving and transmitting packets of information that propagate through communication system 10. IP networks 18a and 18b may be coupled to one or more network elements 24. IP network 18b may offer a communications interface between network element 24 and internet gateway 20. IP networks 18a and 18b may be any local area network (LAN), metropolitan area network (MAN), or wide area network (WAN) or any other appropriate architecture or system that facilitates communications in a network environment. IP networks 18a and 18b implement a TCP/IP communications language architecture in a particular embodiment of the present invention. However, IP networks 18a and 18b may alternatively implement any other suitable communication protocol for transmitting and receiving information within communication system 10.

Internet gateway 20 is a network point or node that operates as a data exchange interface between IP network 18b and any other suitable location in the network. Alternatively, internet gateway 20 may be any server, router, bridge, switch, gateway, or element operable to facilitate network communications. These elements may be inclusive of wireless application protocol (WAP) objects. WAP, as referred to herein in this document, generally represents a specification for a set of communication protocols to standardize the way that wireless devices, such as for example cellular/wireless telephones and radio transceivers, can be used for internet access including e-mail, the world wide web, newsgroups, and internet relay chat systems. Internet gateway 20 may allow a device or a component being used by end user 12 to initiate a request from IP network 18b and may then generally facilitate the delivery of the requested data back to a source or to end user 12. The data may be translated into a WAP format or any other suitable format such that the source of the requested data may be able to interpret the information properly or such that the requested data may be adequately displayed on a suitable device or component.

Internet gateway 20 may cooperate with IP network 18b and GGSN 30 in order to accommodate the delivery of any suitable communications in a network environment such as voice over IP, call features (call waiting, call forwarding, three-way calling, caller I.D., etc.), video phone, video streaming, video conferencing, internet access/browsing, intranet access, virtual private network (VPN) systems, emailing, file transfer, M-commerce, location services (global positioning system (GPS) architectures, navigation, traffic conditions), and value added services (news, weather, sports, game, entertainment, music, etc.) for example.

Internet gateway 20 may additionally provide a layer two or a layer three communications link or a PPP link between end user 12 and IP network 18b. Internet gateway 20 may also fill the role of a NAS, where appropriate, in providing layer two connectivity to a network. Internet gateway 20 may also provide access to the internet, intranets, WAP servers, VPNs, or any other elements operable to communicate with end user 12. Internet gateway 20 may further provide foreign agent support and packet transport for VPN operations or for any other suitable networking configuration where appropriate.

Network element 24 represents a network component that seeks to receive or otherwise access a portion of information associated with a communication flow between RAN 14 (or end user 12) and AAA server 36. Network element 24 may be any device or component within communication system 10 that wishes to receive data relating to the communication flow initiated by end user 12. For example, network element 24 could be a server, a router, a switch, a bridge, a content handling (or processing) component, a media device, or any other device, component or piece of hardware operating in a network environment. In a particular embodiment, network element 24 is a piece of network equipment that provides or offers some service or feature to end user 12. For example, network element 24 may wish to glean any information about the communication flow, such as that a particular end user 12 exists, that they have certain attributes, preferences, privileges, or qualities, and that they have done or performed some task in the network previously.

Network element 24 may also wish to identify end user 12 for authorization purposes or to maintain a profile of end user 12 to provide for accounting records or content billing information. Alternatively, network element 24 may use the information within the communication flow to provide or provision any other type of suitable service, tool, or feature according to particular needs of network components, equipment, or the particular end user 12. Additional services may be related to areas such as routing, accounting, firewalling, filtering, or any other suitable parameters or policies where user-aware characteristics serve as a basis for a service or an enhancement implementation. In configurations where multiple network elements 24 are provided, each network element 24 may be capable of independent operation such that the failure or disablement of one does not necessarily affect the functionality of another or of communication system 10.

In an alternative embodiment of the present invention, network element 24 may be provided within IP gateway 20. In such an embodiment, network element 24 may behave in the same manner as described above in receiving information gleaned from the communication flow in order to track, monitor, or otherwise process the data received from identity broker 16. Network element 24 may then use this data from the communication flow in order to provide user-specific elements to end user 12. For example, network element 24 may use the information to discern an income bracket for a group of end users and provide some portion of information targeted for that group of end users.

In a particular embodiment where a RADIUS communications protocol is being used in conjunction with network element 24, the nature of RADIUS communication allows network element 24 to selectively receive specific information about the communication flow. This is because RADIUS has separate accounting flows and access flows, which allow for a selective dissemination of data to network element 24. For example, in certain scenarios, network element 24 may be interested in only receiving a user-name, a phone number, or a password. Additionally, other network equipment may not necessarily be interested in receiving certain information and thus may be excluded from those particular communication flows.

Network element 24 may include a table (transient or otherwise) for storing information such as the hardware end user 12 is currently using, the service provider offering service to end user 12, network characteristics such as information related to GGSN 30, packet data serving node (PDSN) characteristics, or any other suitable user profile characteristic or parameter that may be learned from inspecting the communication flow. Network element 24 may also perform a layer two to layer three mapping. Network element 24 may identify and further authenticate end user 12 and then permit end user 12 access to a selected network. For example, network element 24 may allow access to IP network 18a and possibly not permit access to IP network 18b. Network element 24 may also perform layer three to layer seven (or higher) mapping.

GGSN 30 is a network node that facilitates a communication session involving end user 12. GGSN 30 operates in a GPRS environment that may be working in conjunction with multiple serving GPRS support nodes (SGSNs) to provide a communications medium in a GPRS service network environment. GGSN 30 may be inclusive of a walled garden (used to grant access or privileges to a selected end user 12) or any other suitable mechanism that a network operator may choose to implement in providing some connectivity for the network. GPRS represents a packet-based data bearer service for communication services that may be delivered as a network overlay for any type of suitable network configuration or platform. GPRS may generally apply packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections. Alternatively, GGSN 30 may be replaced with any other suitable communications node operable to facilitate the delivery of a communication flow from end user 12 to identity broker 16.

It is important to note that GGSN 30 has been offered for purposes of example only. Because identity broker 16 may be used in any network environment, GGSN 30 may be replaced with any suitable communicative component, device, or element, such as a NAS for example. The illustration of GGSN 30 has only been provided for purposes of teaching and thus any element may be used to effectuate its operations in order to provide a data exchange node or platform between various elements in communication system 10.

AAA server 36 is a server program that receives end user requests for access to networking equipment or resources. Networking resources refers to any device, component, or element that provides some functionality to end user 12 communicating in communication system 10. AAA server 36 may also provide AAA services and management for a corresponding network. Authorization generally refers to the process of giving end user 12 permission to do or to access something. In multi-user computer systems, a system administrator may define for the system which end users are allowed access to given locations in the system and, further, what privileges are provided for end user 12. Once end user 12 has logged into a network, such as for example IP network 18a, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access to a selected area. Authentication generally refers to the process of determining whether end user 12 is in fact who or what it is declared to be. In the case of private or public computer networks, authentication may be done through the use of unique identification elements such as a user identity or log-on passwords. Knowledge of the password offers a presumption that end user 12 is authentic. Accounting generally refers to financial or session information associated with each end user 12 or each network and may additionally include trafficking information, session timing information, data transfer statistics, or information relating to other information flows within communication system 10.

AAA server 36 may receive the IP address and other parameters from any suitable source, such as network element 24, or alternatively from a dynamic host configuration protocol (DHCP) server or a domain name system (DNS) database element, in order to direct data to be communicated to end user 12. AAA server 36 may include any suitable hardware, software, component, or element that operates to receive data associated with end user 12 and provide corresponding AAA-related functions to network components within communication system 10. Authorization and IP address management may be retrieved by AAA server 36 from a layer two tunneling protocol network server (LNS), which may be provided to address secure services for end user 12 where appropriate.

In an alternative embodiment of the present invention, communication system 10 may be implemented with any other suitable server (used to supplant AAA server 36) or with any other passive (or incidental) server or element that replaces AAA server 36 and operates as another network element. Additionally, communication system 10 may be configured without AAA server 36 in accordance with the teachings of the present invention. In such an arrangement, identity broker 16 may be configured to ignore AAA results and to properly forward information to network element 24. Responses from network element 24 may be treated as acknowledge (ACK) signals back to RAN 14. Other suitable intra-communications between various elements within communication system 10 in the absence of AAA server 36 may be made where appropriate and according to particular needs.

In operation, a communication session may be initiated by end user 12 and received by RAN 14. Also, as indicated by an arrow 50 in FIG. 1, an alternative data source may provide some stream of information associated with end user 12 that serves as a basis for a communication flow to be delivered to identity broker 16. This information may be communicated directly or indirectly (via one or more pieces of network equipment) to identity broker 16. In the case where RAN 14 is implemented, GGSN 30 may then initiate a communication with identity broker 16. The internet traffic generated by end user 12 may be directed to GGSN 30 which may use AAA server 36 in order to properly authenticate, authorize, or maintain an accounting status associated with end user 12. The AAA functions may be implemented on a corresponding IP network where appropriate. AAA information may also be directed to identity broker 16. Identity broker 16 may operate as a AAA proxy in forwarding AAA messages to/from AAA server 36. In addition, identity broker 16 may construct a table or in-memory data store of information correlated to IP addresses associated with one or more end users 12. Such a table is described in more detail below with reference to FIG. 2.

The alternative data source represented by arrow 50 may be representative of location servers, user preference databases, stores specifying the access devices used by a given end user 12, or any other suitable end user characteristics or network parameters. One role of identity broker 16 may be to glean and to store this combination of real-time and static data. Identity broker 16 may also make this information available to any interested network equipment such as network element 24. In order to make this data available, identity broker 16 may provide a networking interface such that network equipment and servers may initiate queries to identity broker 16 to resolve a network address into an identity. Data may also be used to resolve or correlate information with a source. This information may be accessed by equipment and servers inside a network operator's domain or by outside parties where appropriate who have been permitted access privileges by a network operator. The interface may be implemented as an XML dialect transported over a user datagram protocol (UDP) in accordance with an example embodiment of the present invention.

The combination of intercepting the AAA flow and aggregation/caching data from any suitable source enables identity broker 16 to provide a general solution to the problem of enabling network equipment such as network element 24 to provide services to end users 12 based on their identity and situation. As referred to herein, 'situation' may reflect any circumstance relative to a network flow or to a user profile of end user 12. This may be inclusive of characteristics or items such as the identity of end user 12, network access technologies (and their associated parameters), end user preferences, the physical location of end user 12, quality of service parameters, network conditions, or any other suitable characteristics associated with the communication flow within communication system 10. Thus, identity broker 16 may correlate specific information (such as an IP address that may be temporary or permanent) with user identity data in real-time and publish the resulting information to network switching, routing, and content handling equipment, in addition to HTTP media devices, content servers, and any other interested equipment that may be included in the network. This may be effectuated without requiring end user 12 to take any special initiative or action beyond those actions normally required to access a network.

Figure 2:
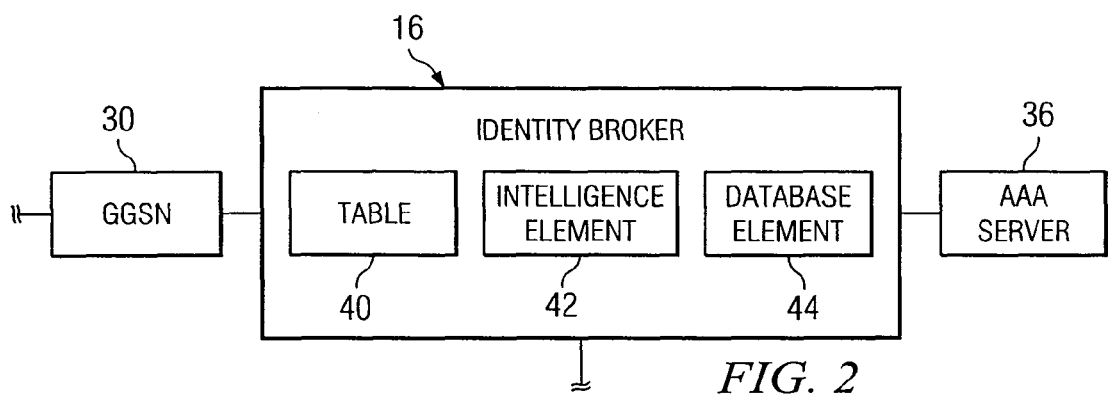
FIG. 2 is a simplified block diagram of an identity broker for distributing data.

FIG. 2 is a simplified block diagram illustrating additional details relating to identity broker 16. In a particular embodiment of the present invention, identity broker 16 includes a table 40, an intelligence element 42, and a database element 44. These elements provided in identity broker 16 are offered as potential enhancements to its structure and should not be construed to limit or to constrain the teachings of the present invention. Additionally, any of these elements may be provided external to identity broker 16 where appropriate or combined in accordance with particular needs.

Table 40 is a data storage unit that tracks, maintains, or identifies the types of information that network element 24 may seek to obtain. In addition, table 40 may also keep track of when this information needs to be provided to one or more network elements 24. Table 40 may be configured such that it shares information with network vendors or other equipment within the network and opt not to share such information with others. Table 40 may also be used in order to build information or an in-memory data store and hold it persistently and potentially as long as end user 12 is active in communication system 10. Alternatively, table 40 may temporarily store information about the communication flow involving end user 12 for the duration of the communication session or communication flow.

The information stored in table 40 may include elements such as an identity token assigned to end user 12 and gleaned from the AAA flow, the IP address associated with end user 12, and any other suitable additional information for diverse alternate sources of data. The alternate sources of data may include location servers, user preference databases, data stores specifying the access devices used by given users, or any other suitable information or parameters in accordance with particular needs. Table 40 (or database element 44) may also store one or more end user profiles associated with clients or customers in the network. The end user profiles may contain any appropriate parameters or characteristics of end user 12 (or of the network) that may affect treatment of communications links, tunnels, or sessions.

Each profile may also include data reflecting bandwidth allocation parameters and/or information relating to QoS characteristics designated for end user 12. Identity broker 16 may also provide a point of management to a service provider (or any other entity) in order to control one or more operations associated with end user 12 such as quality of service, access, privileges, or network enhancements. Where appropriate, any of the information stored in identity broker 16 may be alternatively stored within internet gateway 20.

Table 40 may be populated in a variety of ways. For example, when end user 12 connects to the network, a RADIUS request is made on its behalf by a NAS or any other appropriate device. In a mobile networking scenario this request, generally referred to as an Access-Request, may contain the user-ID in the User-Name attribute or in the calling station-ID attribute, which uniquely identifies which end user 12 is requesting the information from the network. If AAA server 36 authenticates and authorizes end user 12 successfully, a RADIUS Access-Accept message may be communicated back to the RADIUS client (internet gateway 20 or a NAS) with an IP address in the framed-IP address attribute. The IP address may be the address used by end user 12 when it sends IP packets to internet gateway 20. Identity broker 16 may inspect the RADIUS packets exchanged and build table 40 that binds a user-ID with an assigned IP address. Entries within table 40 may be cleaned up, deleted, or updated periodically (or alternatively updated or changed based on some event or modification to system parameters) in order to accurately reflect one or more source profiles associated with one or more end users 12. Other parameters to be stored in the end user profile may include data relating to the network access technology being implemented by end user 12 and its associated characteristics, preferences relating to the network communications, or the physical location of end user 12.

Intelligence element 42 is a network component that includes information designating one or more backup network elements for network element 24. In scenarios in which network element 24 becomes inoperational or otherwise malfunctions (temporarily or permanently), intelligence element 42 may direct identity broker 16 to provide specified data to a backup network element such that the dissemination of information relating to the communication flow is uninterrupted. Intelligence element 42 may also include an overall mapping of all network devices or components and their corresponding back-ups within communication system 10 for purposes of redundancy.

Database element 44 is a storage element that maintains information relating to end user 12 in a persistent or temporary fashion. The information that is persistently stored in database element 44 provides storage for data that may be used by network element 24 if it is temporarily rendered inoperational or otherwise needs to reload a portion of data relating to the communication flow. When recovering from a temporary block of inoperation, network element 24 may query database element 44 after operation has resumed and retrieve any required information in order to continue in the process of gleaning information about communication flows between AAA server 36 and end user 12. Database element 44 may also store redundant information about communication flows within communication system 10.

Table 40, intelligence element 42, and database element 44 may include any suitable hardware, software, components or elements operable to facilitate their operations in communication system 10. Additionally, these elements may be populated using any number of suitable approaches or techniques. Entries within table 40, intelligence element 42, and database element 44 may be managed, cleaned up, deleted, or updated periodically in order to accurately reflect current data relating to communication sessions within communication system 10. Entries could also be deleted specifically or deleted per communication flow. In the case of RADIUS messaging, the population of the elements may be controlled by RADIUS accounting messages or by any other suitable populating protocol according to particular needs.

Figure 3:
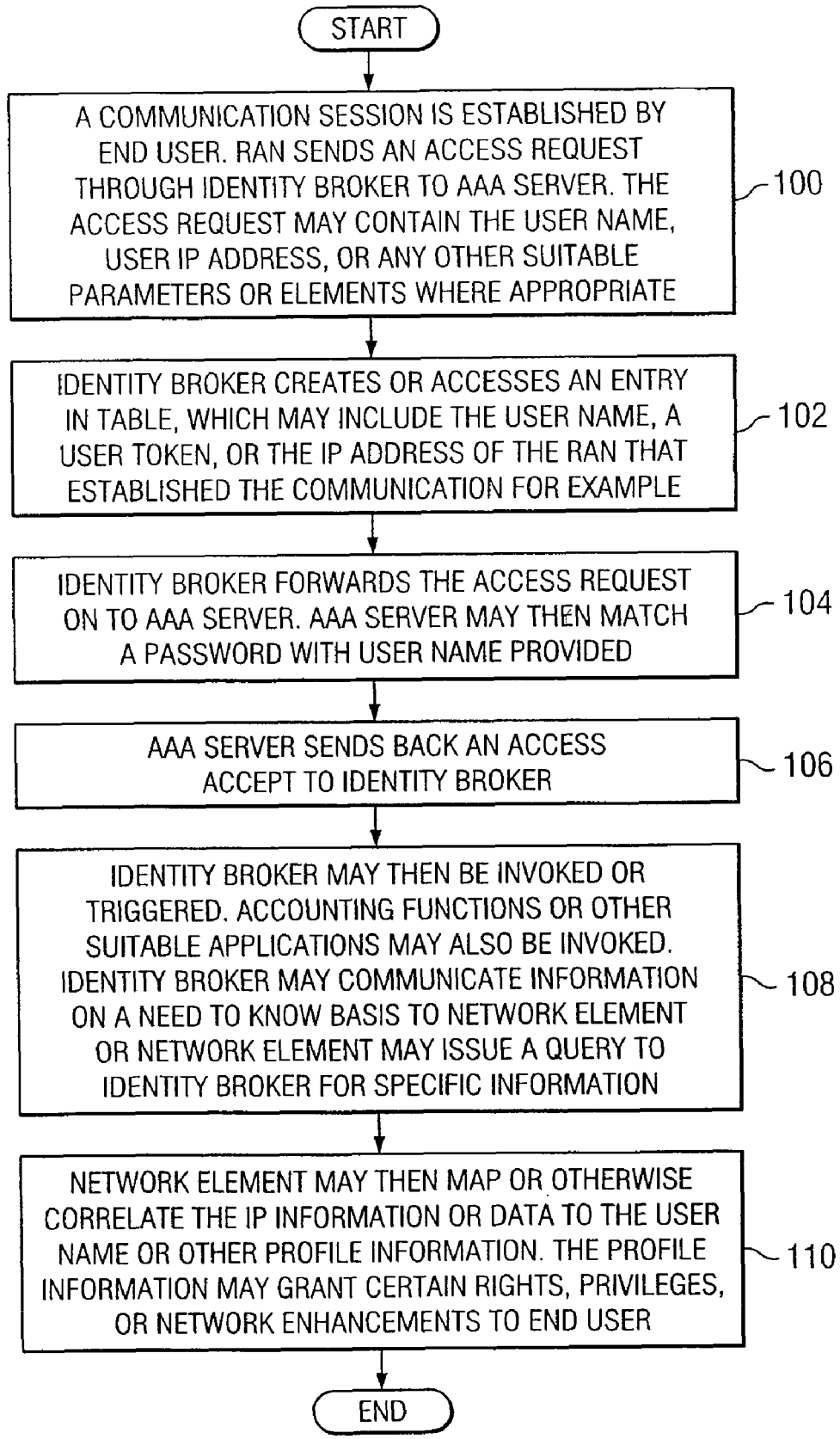
FIG. 3 is a flowchart illustrating a series of steps for distributing data in a network environment.

FIG. 3 is a flowchart illustrating a series of example steps associated with monitoring information in a network environment. The example of network element 24 illustrated in FIG. 3 assumes that it is aware of identity broker 16. At step 100, a PPP session is established by end user 12. RAN 14 may send an access request through identity broker 16 to AAA server 36. The access request may contain the user name, user IP address, or any other suitable parameters or elements where appropriate. In certain scenarios, a push or pull protocol may be implemented or otherwise initiated in generating the request to be sent to AAA server 36. At step 102, identity broker 16 creates or accesses an entry in table 40, which may include the user name, a user token, the IP address of RAN 14 that established the communication, or any other suitable parameter or piece of data.

At step 104, identity broker 16 forwards the access request onto AAA server 36. AAA server 36 may then match a password with the user name provided. At step 106, AAA server 36 sends back an access accept to identity broker 16. At step 108, identity broker 16 may then be invoked or triggered. Accounting functions or other suitable applications may also be invoked. Identity broker 16 may communicate information on a need to know basis to network element 24 or network element 24 may issue a query to identity broker 16 for specific information such as network ratings, user identity information, data related to filtering, or any other suitable information sought by network element 24. The query may also be initiated by a server in the network. At step 110, network element 24 may then map or otherwise correlate the IP information or data to a source, potentially reflecting the user name or other profile information. The profile information may grant certain rights, privileges, or network enhancements to end user 12. For example, the profile information may dictate that end user 12 is provided access to IP network 18a or IP network 18b. In cases where a gateway is implemented in communication system 10, an IP packet may be received by the gateway and the IP addresses of the server and/or network element 24 may be looked up. If neither is found, identity broker 16 may be queried for this information where appropriate.

Identity broker 16 may now send accounting messages to network element 24, whereby network element 24 may send back acknowledge messages. With the requisite knowledge now being communicated to network element 24 for the communication session initiated by end user 12, network element 24 may expect that the packet communicated from RAN 14 propagates to the proper networks and is filtered appropriately according to the designated filtering rule set. Thus, network element 24 has been primed to be ready for the communication session. Now when the communication traffic arrives, network element 24 knows how to properly process the incoming data. Accordingly network element 24 is ready before the communication session is fully authorized.

Some of the steps illustrated in FIG. 3 may be changed or deleted, where appropriate, and additional steps may also be added to the flowchart. These changes may be based on specific system architectures or particular communication arrangements or configurations and do not depart from the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in particular environments, the present invention may be used in any networking environment that seeks to glean information from a communication flow. Communication system 10 may be used in conjunction with asynchronous transfer mode (ATM), frame relay, X.25, or any other type of packet or circuit-switched network.

Additionally, although the present invention has been described with reference to communications between end user 12 and AAA server 36, identity broker 16 as described herein may be implemented for communications between any two components within or external to a network. The present invention has merely described an example network environment for teaching purposes. This should not be construed to limit how or where identity broker 16 is implemented. Moreover, the proxying and monitoring configurations disclosed above may be implemented in conjunction with any component, unit, hardware, software, object, or element involved in the communications process. It should be clear from the foregoing that identity broker 16 may be used outside the field of AAA, where the proxying or monitoring of data is an element of the communications architecture that is implemented. Identity broker 16 may be used in any environment where multiple devices desire to glean information from a communication flow.

In addition, although identity broker 16 has been illustrated as a separate element, it may be included in AAA server 36, network element 24, or in any other element or component within communication system 10. Identity broker 16 has been illustrated in FIGS. 1 and 2 in a designated position for purposes of teaching, but identity broker 16 may be positioned anywhere in the network and included in any additional network equipment or device where appropriate. Moreover, although shown as a single element, identity broker 16 may represent a fault-tolerant system involving a number of pieces of network equipment. Identity broker 16 may also be used in legacy system architectures where appropriate.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. The present invention is not intended to be limited in any way by any statement in the specification that is not otherwise reflected in the appended claims.

What is claimed is:

1. A method comprising:
   intercepting, by an identity broker, an authorization, authentication, and accounting (AAA) flow associated with a user;
   identifying an Internet Protocol (IP) address of the user from the AAA flow;
   forwarding the AAA flow to an AAA server;
   correlating profile information corresponding to the user to the IP address; and
   providing the profile information to a network element to allow the network element to process communication traffic according to the profile information.

2. The method of claim 1, further comprising:
   forwarding a plurality of AAA messages from the AAA server.

3. The method of claim 1,
   the profile information comprising an end user parameter selected from the group consisting of:
   a physical location associated with the user;
   a network access technology associated with the user;
   a network service preference associated with the user; and
   a quality of service associated with the user.

4. The method of claim 1, further comprising:
   storing one or more relationships reflecting that the profile information is to be communicated to the network element.

5. The method of claim 1, further comprising:
   communicating the profile information to a backup network element in response to the network element being inoperative.

6. The method of claim 1, further comprising:
   providing a point of management to control one or more network operations associated with the user.

7. The method of claim 1, further comprising:
   receiving additional information from an alternate data source; and
   providing the additional information to the network element.

8. The method of claim 1, the identity broker comprising a networking interface configured to receive one or more queries from network equipment.

9. The method of claim 1, the identity broker comprising a networking interface configured to receive one or more queries from network equipment and implemented as an extended markup language (XML) dialect transported over UDP.

10. The method of claim 1, further comprising:
    providing secure access to the profile information.

11. An apparatus comprising:
    an identity broker operable to:
    intercept an authorization, authentication, and accounting (AAA) flow associated with a user;
    identify an Internet Protocol (IP) address of the user from the AAA flow;
    forward the AAA flow to an AAA server;
    correlate profile information corresponding to the user to the IP address; and
    provide the profile information to a network element to allow the network element to process communication traffic according to the profile information.

12. The apparatus of claim 11, the identity broker operable to:
    forward a plurality of AAA messages from the AAA server.

13. The apparatus of claim 11, the profile information comprising an end user parameter selected from the group consisting of:
    a physical location associated with the user;
    a network access technology associated with the user;
    a network service preference associated with the user; and
    a quality of service associated with the user.

14. The apparatus of claim 11, the identity broker operable to:
    store one or more relationships reflecting that the profile information is to be communicated to the network element.

15. The apparatus of claim 11, the identity broker operable to:
    communicate the profile information to a backup network element in response to the network element being inoperative.

16. The apparatus of claim 11, the identity broker operable to:
    provide a point of management to control one or more network operations associated with the user.

17. The apparatus of claim 11, the identity broker operable to:
    receive additional information from an alternate data source; and
    provide the additional information to the network element.

18. The apparatus of claim 11, the identity broker comprising a networking interface configured to receive one or more queries from network equipment.

19. The apparatus of claim 11, the identity broker comprising a networking interface configured to receive one or more queries from network equipment and implemented as an extended markup language (XML) dialect transported over UDP.

20. The apparatus of claim 11, the identity broker operable to:

provide secure access to the profile information.

* * * * *